US007700688B2

(12) United States Patent
Uzee et al.

(10) Patent No.: US 7,700,688 B2
(45) Date of Patent: Apr. 20, 2010

(54) BLOCK COPOLYMER COMPOSITION AND TRANSPARENT ELASTOMERIC ARTICLES PRODUCED THEREFROM

(75) Inventors: Andre J. Uzee, Baton Rouge, LA (US); Kenneth A. Toney, Baton Rouge, LA (US); Michael O. Myers, Baton Rouge, LA (US)

(73) Assignee: Dow Global Technologies, Inc., Midland, MI (US)

( * ) Notice: Subject to any disclaimer, the term of this patent is extended or adjusted under 35 U.S.C. 154(b) by 553 days.

(21) Appl. No.: 10/554,588

(22) PCT Filed: Apr. 13, 2004

(86) PCT No.: PCT/US2004/011273

§ 371 (c)(1), (2), (4) Date: Oct. 27, 2005

(87) PCT Pub. No.: WO2004/104095

PCT Pub. Date: Dec. 2, 2004

(65) Prior Publication Data

US 2006/0205874 A1 Sep. 14, 2006

Related U.S. Application Data

(60) Provisional application No. 60/470,461, filed on May 14, 2003.

(51) Int. Cl.
*C08L 53/02* (2006.01)

(52) U.S. Cl. .......................................................... 525/89

(58) Field of Classification Search .................... 525/89
See application file for complete search history.

(56) References Cited

U.S. PATENT DOCUMENTS 4,086,298 A 4/1978 Fahrbach et al.
4,167,545 A 9/1979 Fahrbach et al.
4,173,612 A 11/1979 Kelly
4,180,530 A 12/1979 Bi et al.
4,221,884 A 9/1980 Bi et al.
4,248,980 A 2/1981 Bi et al.
4,248,981 A 2/1981 Milkovich et al.
4,248,982 A 2/1981 Bi et al.
4,248,983 A 2/1981 Bi et al.
4,248,984 A 2/1981 Bi et al.
4,305,990 A 12/1981 Kelly
4,329,309 A 5/1982 Kelly
4,335,221 A 6/1982 Gerberding
4,346,198 A 8/1982 Doak et al.
4,418,180 A 11/1983 Heinz et al.
4,476,180 A 10/1984 Wnuk
4,572,819 A 2/1986 Priddy et al.
4,585,825 A 4/1986 Wesselmann
4,666,987 A 5/1987 Burmester et al.
4,977,014 A 12/1990 Mitchell et al.
5,134,968 A 8/1992 Yancy
5,227,419 A * 7/1993 Moczygemba et al. ...... 524/128
5,242,894 A 9/1993 Arahori et al.
5,358,783 A * 10/1994 Diehl et al. ................. 428/344
H1622 H * 12/1996 Himes ......................... 525/89
5,721,320 A 2/1998 Priddy et al.
5,750,623 A 5/1998 Diehl et al.
6,410,129 B2 6/2002 Zhang et al.
7,064,164 B2 * 6/2006 Knoll et al. ................... 525/89
2005/0215723 A1 * 9/2005 Knoll et al. ................. 525/314
2007/0286818 A1 * 12/2007 Tatapudy et al. .............. 424/45

FOREIGN PATENT DOCUMENTS

DE 2940861 A1 4/1981

OTHER PUBLICATIONS

Holden,et.al., Thermoplastic Elastomers, $2^{nd}$ Edition, pp. 51—53, 1996.
Tung, Journal of Applied Polymer Science 24, 953 (1979).
Runyon, et. al., Journal of Applied Polymer Science 13, 2359 (1969).

* cited by examiner

*Primary Examiner*—Jeffrey C Mullis

(57) ABSTRACT

The present invention relates to a unique blend of elastomeric and thermoplastic monovinylidene aromatic-conjugated diene block copolymers, which form transparent elastomeric products.

18 Claims, No Drawings

BLOCK COPOLYMER COMPOSITION AND TRANSPARENT ELASTOMERIC ARTICLES PRODUCED THEREFROM

CROSS REFERENCE STATEMENT

This application claims the benefit of U.S. Provisional Application No. 60/470,461, filed May 14, 2003. This application also claims the benefit of PCT Application No. PCT/US2004/011273, filed Apr. 13, 2004.

The present invention relates to compositions of monovinylidene aromatic-conjugated diene block copolymers.

BACKGROUND

Elastomeric articles produced from thermoplastic elastomers such as block copolymers are well known. Thermoplastic elastomers, such as copolymers having blocks of monovinylidene aromatic monomer and conjugated diene monomer are often blended with other thermoplastic polymers, for example, polypropylene, polystyrene, polyethylene, or ethylene vinyl acetate copolymers, to improve processing. These thermoplastic polymers tend to reduce the viscosity of the elastomers and provide improved processability by reducing the elastic nature of the composition, as described in U.S. Pat. Nos. 4,329,309; 4,173,612; 4,305,990; 4,977,014; and 6,410,129 B2, the teachings of which are incorporated herein by reference.

Typically, the elastomeric block copolymer is compounded with a thermoplastic polymer and fed to an extruder to produce film, fiber or netting materials. However, this process is expensive due to the amount of scrap material generated, and the potential of low quality or non-homogeneity of the product. Further, it is also known in the art that blends of elastomeric block copolymer and thermoplastic polymers can be directly fed to converting extruders to produce useful articles. However, this process requires feeding systems to accommodate multiple components, and the potential for low quality or non-homogeneity of the converted article remains. An additional disadvantage of the compositions discussed above includes the production of "opaque" or "hazy" products (that is, low transparency) due to significant differences in the refractive indices of the polymers.

Therefore, what is needed is a "transparent" block copolymer or blend composition that can be converted into a useful "transparent" elastomeric article. Further, what is needed is a blended product of an elastomeric block copolymer and a thermoplastic block copolymer that can be produced in the same polymerization process, blended while in solution and produced as a single pellet product, eliminating the need for compounding or direct feed of multiple components to an extruder.

SUMMARY

The present invention is an elastomeric polymer blend composition comprising:

A) from 65 to 92 parts by weight of at least one monovinylidene aromatic-conjugated diene block copolymer, hereafter referred to as elastomeric block copolymer, having a monovinylidene aromatic content of less than 50 weight percent, based on the total weight of the elastomeric block copolymer and a weight average molecular weight (Mw) of from 50,000 to 400,000;

B) from 8 to 35 parts by weight of at least one monovinylidene aromatic-conjugated diene copolymer, hereafter referred to as thermoplastic block copolymer, having a monovinylidene aromatic content of 50 weight percent or more, based on the total weight of the thermoplastic block copolymer and a weight average molecular weight of from 50,000 to 300,000; and C) from 0 to 30 parts by weight of an extender oil, based on the total weight of A, B and C.

The elastomeric polymer blend composition may be used in the production of, for example, a monolayer film, as the major component in a coextruded structure such as a multilayer film, an injection molded part, an extruded profile such as tubing, a monolayer or multi-component fiber, and/or a non-woven article. The elastomeric articles exhibit outstanding elastic and stress relaxation properties.

DETAILED DESCRIPTION

Unless otherwise stated, each number range, such as from 8 to 35 parts by weight, includes both endpoints of the range.

The present invention relates to a low stress relaxation "transparent" elastomeric polymer blend comprising at least one elastomeric block copolymer and at least one thermoplastic block copolymer. Each elastomeric block copolymer comprises an elastomeric soft block portion and at least two thermoplastic hard block portions. Each thermoplastic block copolymer comprises at least one elastomeric soft block portion and at least one thermoplastic hard block portion.

As used herein, the term "stress relaxation" refers to the percentage loss of tension or load between the maximum load or force encountered after elongating an elastomeric material at a specific rate of extension to a predetermined length (or the load or force measured at some initial length) and the remaining load or force measured after the sample has been held at that length or elongation for a specified period of time. Relaxation is expressed as percentage loss of the initial load encountered at a specific extension of an elastomeric material. As used herein, the terms "transparency" or "highly transparent" refers to a greater than 75 percent (%) value for total transmission. Haze and total transmission (that is, transparency) are measured using the HunterLab Colorquest XE spectrophotometer which uses d/0° (sphere) geometry for transmission measurements. While this haze measurement does not conform to ASTM method D 1003, "Standard Test Method for Haze and Luminous Transmittance of Transparent Plastics," due to differences in instrument geometry, values obtained for certified standards are similar. Haze is equal to the percent of diffuse transmittance relative to the total transmittance of the incident light, where diffuse transmittance is measured from the light forward scattered at angles greater than 2.5°. As used herein, the terms "elastic" or "elastomeric" refer to any material which is capable of being elongated or deformed under an externally applied force, and which will substantially resume its original dimension or shape, sustaining only small permanent set (typically no more than about 20 percent), after the external force is released. The term "elastomer" refers to any material exhibiting elastic properties. As used herein, the term "elastomeric block copolymer" refers to a block copolymer that contains less than 50 weight percent (wt %) and more preferably less than 35 wt % monovinylidene aromatic monomer in the block copolymer, based on the total weight of the block copolymer. As used herein, the term "thermoplastic block copolymer" refers to a block copolymer that contains 50 wt % or more, and more preferably 65 wt % or more, of a monovinylidene aromatic monomer in the block copolymer, based on the total weight of the block copolymer.

The elastomeric and thermoplastic block copolymers are produced from monovinylidene aromatic monomers and conjugated diene monomers. Monovinylidene aromatic monomers suitable for use in preparing the block copolymers include, but are not limited to, monovinylidene aromatic monomers described in U.S. Pat. Nos. 4,666,987, 4,572,819 and 4,585,825, and 5,721,320 which are incorporated by reference herein. Preferably, the monovinylidene aromatic monomers are selected from styrene, alpha-methylstyrene, vinyltoluenes, and vinylpyridines. Conjugated diene monomers include, but are not limited to 1,3-butadiene; isoprene, chloroprene, and 1,3-pentadiene. Preferred monomers are styrene, 1,3-butadiene and isoprene.

In a preferred embodiment, the block copolymers are styrenic block copolymers or styrene-diene block copolymers, such as styrene-butadiene (SB), styrene-butadiene-styrene (SBS), styrene-isoprene (SI), styrene-isoprene-styrene (SIS), SISIS, and SBSBS. Alternatively, the monovinylidene aromatic blocks may be different such as in a styrene-diene-alphamethylstyrene block copolymer, or the diene blocks may be different such as in a styrene-isoprene-styrene-butadiene-styrene (SISBS) block copolymer. The block copolymers may be linear or branched, having from 2 to 7 blocks. However, the block copolymers are preferably linear triblock copolymers, such as SBS and SIS. Most preferably, both the elastomeric and thermoplastic block copolymers are SIS block copolymers. The block copolymers may also be tapered, wherein there is a gradual compositional transition from one block to another rather than an abrupt change, as is well known in the art.

The elastomeric block copolymer used in the polymer blend composition of the present invention typically corresponds to one of the following formulas:

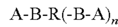

$$\text{A-B-R(-B-A)}_n \qquad \text{Formula I}$$

or $$\text{A-(BA-)}_x\text{-BA} \qquad \text{Formula II}$$

wherein:

each A is independently, that is, each A may be the same or different, a polymer block comprising a monovinylidene aromatic monomer and each B is independently, that is, each B may be the same or different, a polymer block comprising a conjugated diene and optionally a monovinylidene aromatic monomer, R is the remnant of a multifunctional coupling agent, n is an integer from 1 to 5, and x is a real number from 0 to 4.

In Formula I, n is preferably 1 to 3 and more preferably 1. In Formula II, x is preferably an integer of from 0 to 2, and more preferably 0.

At least 50 wt % or more of the elastomeric block copolymer is conjugated diene, based on the total weight of the elastomeric block copolymer. The conjugated diene may comprise a single conjugated diene or mixture of more than one conjugated diene such as a mixture of isoprene and butadiene.

The monovinylidene aromatic block of the elastomeric block copolymer is less than 50 wt % and is typically from 8, preferably from 10, more preferably from 12, and most preferably from 15 wt % to less than 50, preferably less than (<)45, more preferably <40 and most preferably <35 wt %, based on the total weight of the elastomeric block copolymer.

The elastomeric block copolymer typically has a Mw in the range of 50,000 to 400,000 Daltons. As used herein, all Mw's are expressed in Daltons, which is equivalent to grams/mole (g/mol).

In linear elastomeric block copolymers, each monovinylidene aromatic monomer block preferably has a peak Mw of at least (≧) 9,000, more preferably ≧9,500 and most preferably ≧10,000. Preferably, each monovinylidene aromatic monomer block has a peak Mw of 62,000 or less (≦), more preferably ≦53,000, and most preferably ≦44,000. Each block may have its' own individual Mw. In other words, each monovinylidene aromatic monomer block within the elastomeric block copolymer does not necessarily have to be the same Mw. Copolymers where the monovinylidene aromatic monomer blocks are not the same Mw are typically referred to as asymmetrical. Preferably, each conjugated diene block has a peak Mw of ≧40,000, more preferably ≧50,000 and most preferably ≧60,000 to ≦200,000, more preferably to ≦175,000, and most preferably to ≦150,000.

In one embodiment, the elastomeric block copolymer is in radial form, as represented by Formula I, and each monovinylidene aromatic block has a peak Mw of ≧9,000, more preferably ≧9,500, and most preferably ≧10,000 to 32,000, more preferably to 27,000 and most preferably to 22,000. Preferably, each conjugated diene block has a peak Mw of ≧31,000, more preferably ≧38,000 and most preferably ≧41,000 to 86,000, more preferably to 84,000 and most preferably to 81,000. Preferably, the radial elastomeric block copolymer has a peak Mw of ≧135,000, more preferably ≧140,000 and even more preferably ≧145,000 to 400,000, more preferably to 375,000 and even more preferably to 350,000.

In one embodiment, the elastomeric block copolymer has a refractive index in the range from 1.5240 to 1.5526, preferably from 1.5256 to 1.5492, more preferably in the range from 1.5269 to 1.5458, and most preferably from 1.5289 to 1.5424. Refractive index is measured using pressed films less than 0.020 inches (0.05 cm) thick using an Abbe-type refractometer at 25° C. according to ASTM Standard D-542.

The thermoplastic block copolymer useful in the polymer blend composition of the present invention typically correspond to Formulas I and II as stated previously. In addition, the thermoplastic block copolymer can correspond to Formula III:

$$\text{B}_y\text{-(AB-)}_z\text{-AB} \qquad \text{Formula III}$$

wherein A and B are as defined previously, y is 0 or 1, and z is a real number from 0 to 4. However, less than 50 wt % of the thermoplastic block copolymer is a conjugated diene, based on the total weight of the thermoplastic block copolymer. The conjugated diene may comprise a single conjugated diene or mixture of conjugated dienes such as a mixture of isoprene and butadiene.

The monovinylidene aromatic block of the thermoplastic block copolymer is ≧50 wt %, more preferably ≧60, and most preferably ≧65 wt % to 95, more preferably to 90, and most preferably to 85 wt %, based on the total weight of the thermoplastic block copolymer.

The thermoplastic block copolymer typically has a Mw in the range of 50,000 Daltons to 300,000 Daltons.

In linear thermoplastic block copolymers, each monovinylidene aromatic monomer block of the thermoplastic block copolymer has a peak Mw that is desirably ≧12,500, preferably ≧14,000, more preferably ≧16,250 and most preferably ≧18,750. Each monovinylidene aromatic monomer block has a peak Mw that is desirably ≦250,000, preferably ≦225,000, more preferably ≦200,000 and most preferably ≦175,000. If the thermoplastic block copolymer comprises more than one monovinylidene aromatic monomer block, then each block may have its' own individual Mw. Each conjugated diene block of a linear thermoplastic block copolymer has a peak Mw that is preferably ≧5,000, more preferably ≧10,000 and most preferably ≧15,000 to ≦125,000, more preferably to ≦120,000, and most preferably to ≦115,000.

In one embodiment, diblock structures as derived in Formula III are useful thermoplastic block copolymers. In this case, each conjugated diene block has a peak Mw of ≧2,500, more preferably ≧7,000 and most preferably ≧12,000 to ≦150,000, more preferably to ≦100,000, and most preferably to ≦50,000.

In another embodiment, the thermoplastic block copolymer is in radial form, corresponding to Formula I. In this embodiment, each monovinylidene aromatic block has a peak Mw that is preferably ≧7,400, more preferably ≧8,800, and most preferably ≧11,700 to 83,800, more preferably to 80,000, and most preferably to 78,000. Each conjugated diene block of a radial thermoplastic block copolymer has a peak Mw that is preferably 700 or more, more preferably ≧2,000 and most preferably ≧3,000 to ≦45,000, more preferably to ≦40,000, and most preferably to ≦155,000. The radial thermoplastic block copolymer has a peak Mw that is preferably ≧50,000, more preferably ≧70,000 and even more preferably ≧80,000 to 300,000, more preferably to 280,000, and even more preferably to 260,000.

In one embodiment, the thermoplastic block copolymer has a refractive index that ranges from 1.5526 to 1.5925, preferably from 1.5624 to 1.5882, more preferably from 1.5667 to 1.5839, and most preferably from 1.5753 to 1.5796.

Other related copolymers and methods of producing the same are disclosed in U.S. Pat. Nos. 4,086,298, 4,167,545, 4,335,221, 4,418,180, 4,180,530, 4,221,884, 4,346,198, 4,248,980, 4,248,981, 4,248,982, 4,248,983, and 4,248,984, the disclosures of which are hereby incorporated by reference.

The elastomeric and thermoplastic block copolymers can be prepared by anionic polymerization. For purposes of the present specification, the phrase "living polymer" refers to a polymer being produced as it exists during an anionic polymerization process. Examples of sequential polymerization processes that result in living block polymers after completion of polymerization are known in the prior art and include U.S. Pat. No. 5,242,984 and U.S. Pat. No. 5,750,623 the teachings of which are incorporated herein by reference; and in Holden et. al., Thermoplastic Elastomers, 2nd Edition; pages 51-53, 1996.

Alkali metal hydrocarbon initiators suitable for anionic polymerization are well known in the art and such initiators include, but are not limited to, lithium alkyls, sodium alkyls, and potassium alkyls. Preferred initiators are lithium alkyls, such as sec-butyllithium and n-butyllithium.

Solvents or diluents suitable for the anionic polymerization are also well known in the art. Examples included aromatic hydrocarbons, saturated aliphatic hydrocarbons, saturated cycloaliphatic hydrocarbons, linear ethers and cyclic ethers, and mixtures thereof. Preferred solvents or diluents are cyclohexane, n-hexane, and isopentane, and mixtures thereof.

The polymer blend of the present invention typically comprises from 65 wt %, preferably from 70 wt %, more preferably from 72 wt %, and most preferably from 75 to 92 wt %, preferably to 90 wt %, more preferably to 85 wt % and most preferably to 80 wt % of elastomeric block copolymer A, based on the total weight of A, B and C, each of which is defined herein.

The amount of thermoplastic block copolymer B used in the polymer blend composition of the present invention depends upon the article produced and the method of producing the article. One skilled in the art would recognize the necessary properties that the composition of the invention must have to allow the composition to be processed by the chosen method. For example, films may be cast wherein as little as 8 parts by weight (pbw) of thermoplastic block copolymer is used, whereas, at least 15 pbw of the thermoplastic block copolymer is preferably used to prepare films by extrusion blowing methods or in the production of fibers and non-woven structures. In injection molded and profile extruded applications, the composition would likely be at least 15 pbw and up to 35 pbw of thermoplastic block copolymer, based on the combined weights of A, B and C.

The polymer blend of the present invention typically comprises from 8 wt %, preferably from 10 wt %, more preferably from 12 wt %, and most preferably from 14 wt % to 35 wt %, preferably to 32 wt %, more preferably to 30 wt % and most preferably to 25 wt % of the thermoplastic block copolymer B, based on the total weight of A, B and C.

If a blend of elastomeric block copolymers, such as a SIS block copolymer and a SBS block copolymer is desired, the SIS block copolymer is preferably present in an amount of ≧50 wt %, more preferably ≧60 wt % and most preferably ≧70 wt %, based on the total weight of the elastomeric block copolymers. Blends of elastomeric copolymers comprising high levels of isoprene-containing block copolymers show fewer tendencies to form gels in extrusion processes versus elastomeric block copolymers containing butadiene blocks.

Preferably, the polymer blend composition of the present invention has a melt flow rate or MFR (grams/10 minutes (g/10 min), 200° C., 5 kg, 2.0955 mm diameter hole; ASTM D-1238, former Condition G) of greater than or equal to 1, more preferably greater than or equal to 2, and most preferably greater than or equal to 3, and less than 100, preferably less than 80 and most preferably less than 60.

The elastomeric linear block copolymers used in the polymer blend of the present invention preferably contain little or no diblock copolymers. Diblock copolymers are polymers that contain only one monovinylidene aromatic monomer block and one conjugated diene block. The presence of significant amounts of diblock in a linear elastomeric block copolymer results in inferior properties in elastomeric articles prepared from such a block copolymer relative to the same properties of elastomeric articles prepared from compositions of the invention, for example, lower stress retention. Preferably, any diblock copolymers are present in linear block copolymers at an amount of ≦5 wt %, more preferably ≦2 wt %, based on the total weight of the elastomeric block copolymer.

The presence of diblock copolymers can be prevented by utilizing a sequential polymerization process. Such sequential polymerization processes are well known in the art and preferred for the preparation of the block copolymers used in this invention, as disclosed in U.S. Pat. Nos. 5,242,984 and 5,134,968, both of which are incorporated herein by reference.

If elastomeric radial block copolymers, which are typically produced via a coupling process, are used in the polymer blend compositions of the present invention, larger amounts of diblock copolymers can be tolerated. Preferably, the diblock copolymers are present in radial block copolymers at an amount of ≦15 wt %, more preferably ≦10 wt %, and most preferably ≦6 wt %, based on the total weight of the radial block copolymer.

In addition to the elastomeric block copolymer A and the thermoplastic block copolymer B, the polymer blend of the present invention can also comprise other additives commonly used in polymer compositions such as extenders, slip agents, pigments, anti-oxidants, heat stabilizers, photostabilizers and the like. In a preferred embodiment, the blend of the present invention does not contain any significant amount of additional polymers besides the elastomeric and thermoplastic copolymers. A significant amount refers to amounts which would substantially alter the physical properties of the blend and is typically greater than 5 wt %, based on the total weight of A, B and C.

Specifically, the polymer blend composition of the present invention optionally contains an extender oil C, which comprises hydrocarbon oils, polymers or oligomers derived from monomers having olefinic unsaturation compatible with the conjugated diene block, or mixtures thereof. Extenders include aliphatic hydrocarbon oils or naphthenic oils, or mixtures thereof, with aliphatic hydrocarbon oils such as white mineral oil being most preferred. The extender or oil, if used, is typically present in an amount of from 1 wt %, preferably from 2 wt %, more preferably from 3 wt % and most preferably from 4 wt % to 30 wt %, more preferably to 25 wt %, and most preferably to 20 wt %, based on the total weight of A, B, and C.

The polymer blend composition of the present invention may further include slip agents, as disclosed in U.S. Pat. No. 4,476,180, which is incorporated herein by reference. Examples of such agents are those commonly derived from amides of fatty acids having from 12 to 22 carbon atoms. Such slip agents are commonly incorporated in compositions in amounts of from 0.05 pbw to 5 pbw of the polymer blend composition. Such slip agents should be used at minimal levels so as not to impart opacity or increases in haze or reduction in transparency to the blend.

Heat stabilizers and antioxidants include IRGANOX® 1010 tetrakis(methylene (3,5-di-tert-butyl-4-hydroxyhydrocinnamate)) methane, IRGANOX® 1076 octadecyl 3,5-d-tert-butyl-4-hydrohydroxycinnamate and IRGANOX® 565 4-((4,6-bis(octylthio)-s-triazin-2-yl)amino)-2,6-di-tert-butylphenol. Secondary antioxidants may also be used with primary antioxidants, for example aromatic phosphite compounds such as tris-nonyl-phenol phosphite. Heat stabilizers and antioxidants are incorporated in the compositions of the invention at a level of from 0.05 pbw to 1.5 pbw, based on the total weight of the polymer blend composition. Such antioxidants should not impart opacity or increases in haze or reduction in transparency to the blend.

Examples of preferred photostabilizers include derivatives of benzophenone. Such photostabilizers are generally incorporated in the polymer blend composition at a level from 0.1 pbw to 3 pbw of the polymer blend composition. Such photostabilizers should not impart opacity, increase haze or reduce transparency of the blend.

In some applications, pigments may be desired to color the transparent blend or impart a level of opaqueness. Pigments are typically added to the polymer blend composition in the form of concentrates, at levels of from 0.5 pbw to 5 pbw, based on the total weight of the polymer blend composition. Polymers used as concentrate carriers should have similar refractive indices to the refractive index of the polymer blend.

Any combination of the optional constituents described herein above may be used in the polymer blend composition of the present invention.

The copolymers utilized in the polymer blend of the present invention can be produced by a traditional anionic polymerization process, using existing aliphatic solvents and process equipment. The copolymers can be blended together in a vessel, optionally with an extender oil; extruded and devolatilized to produce a single pellet product, for conversion into, for example, films, fibers, non-woven products and injection molded articles.

The elastomeric and thermoplastic block copolymers can be made separately, in different reactors or can be prepared simultaneously within the same reactor. In one embodiment, the present invention is related to a process of producing a blend of a thermoplastic copolymer and an elastomeric copolymer, comprising:

- polymerizing a monovinylidene aromatic monomer and a diene monomer to produce an elastomeric block copolymer polymerization mixture comprising a block copolymer of less than 50 wt % monovinylidene aromatic monomer, based on the total weight of the block copolymer;
- polymerizing a monovinylidene aromatic monomer and a diene monomer to produce a thermoplastic block copolymer polymerization mixture comprising a block copolymer of at least 50 wt % monovinylidene aromatic monomer, based on the total weight of the block copolymer;
- contacting the elastomeric copolymer polymerization mixture with the thermoplastic copolymer polymerization mixture to form a blended polymerization mixture;
- devolatilizing the blended polymerization mixture to form a blended polymer product, and
- pelletizing the blended polymer product.

In one embodiment, the elastomeric and thermoplastic block copolymers are produced simultaneously in an anionic reaction process, with the optional addition of an extender oil prior to extrusion into pellets. Additional components such as slip agents, stabilizers, pigments, and the like, can be added to the blending process prior to pelletization or added to the extrusion process via separate feeding system as is typically done in the industry. Antiblock agents can also be added to the extruded pellets. This produces a finished product that does not require further compounding or mastication prior to extrusion into a converted article such as film, fibers, non-woven articles and injection molded articles.

If the elastomeric and thermoplastic copolymers are produced separately via anionic polymerization, the final composition of the invention and optional additives, such as the extender oil, can be prepared by contacting the ingredients in an appropriate mixing device such as an extruder, twin-screw extruder or a high efficiency mixer typically used for thermoplastics or thermoplastic elastomers. However, it is preferred to blend the components prior to extrusion or further processing.

Furthermore, if the elastomeric and thermoplastic copolymers are produced separately, the mixing can be performed in the process of forming an article, for instance, in a blown or cast film process, an injection molding process, or a fiber spinning process with multiple feed systems and the appropriate mixing screw and extruder design.

The polymer blend composition of the present invention produces articles having the following properties and advantages:

a tensile strength greater than 10.0 megapascals (MPa);

a peak force at 200 percent elongation of greater than 0.7 MPa a set of 15 percent (%) or less;

a stress relaxation of 20% or less;

a % haze of less than 50%; and a % transparency of greater than 75%.

As used herein, the term “tensile strength” or “tensile stress” is defined by the following equation:

Tensile stress MPa=F/A where F=observed force at specified elongation

A=cross-sectional area of unstretched specimen.

As used herein, the term "elongation" is defined by the following equation:

Elongation (%)=100(L—$L_0$)/$L_0$ where L=observed distance between the bench marks on stretched specimen in cm $L_0$=original distance between the bench marks in cm.

As used herein, the terms "set" or "percent set" refer to the percent deformation of an elastomeric material measured while the material is in a relaxed condition for a specified period of time (that is, 60 seconds for the Test Methods described herein) after the material is released from a specified elongation without allowing the material to snap back completely. The percent set is expressed as [(zero load extension after one cycle-initial sample gauge length of cycle 1)/(initial sample gauge length of cycle 1)]×100. Zero load extension refers to the distance between the jaws at the beginning of the second cycle before the tensile testing equipment registers a load.

As used herein, the term "high haze" refers to a greater than 50% value for haze and the terms "transparency" or "highly transparent" refers to a greater than 75% value for total transmission. Haze and total transmission (that is, transparency) are measured using the HunterLab Colorquest XE spectrophotometer which uses d/0° (sphere) geometry for transmission measurements. While this haze measurements does not conform to ASTM method D 1003, "Standard Test Method for Haze and Luminous Transmittance of Transparent Plastics," due to differences in instrument geometry, values obtained for certified standards are similar. Haze is equal to the percent of diffuse transmittance relative to the total transmittance of the incident light, where diffuse transmittance is measured from the light forward scattered at angles greater than 2.50. Haze and total transmission (that is, transparency) was obtained on plaques 0.125 inch (0.318 cm) thick.

In one embodiment, the polymer blend composition useful in preparing transparent elastomeric articles, comprises:

(A) from 65 to 92 pbw of one or more elastomeric block copolymer(s) corresponding to one of the formulas: A-B-R(-B-A)$_n$ or A-(BA-)$_x$-BA, wherein each A is a polymer block comprising a monovinylidene aromatic monomer and each B is a polymer block comprising a conjugated diene and optionally a monovinylidene aromatic monomer, R is the remnant of a multifunctional coupling agent, n is an integer from 1 to 5, x is a real number from 0 to 4; at least 50 wt % of the block copolymer is a B block comprised of isoprene or butadiene or combinations thereof; the wt % of monovinylidene aromatic monomer in the block copolymer is less than 50 wt % and is most preferably from 8 to 35 wt %, based on the total weight of the elastomeric block copolymer, the total block copolymer composition contains no more than 5 wt % of a diblock of the formula B-A; the block copolymer has a MFR of from 0.1 to 50 g/10 min; and the elastomeric block copolymer comprises styrene and butadiene; styrene and isoprene; styrene, isoprene and butadiene; or any combination thereof; and (B) from 8 to 35 pbw of one or more thermoplastic block copolymer(s) corresponding to one of the formula: A-B-R(-B-A)n or A-(BA-)$_x$-BA or B$_y$-(AB-)$_z$-AB: wherein each A is a polymer block comprising a monovinylidene aromatic monomer and each B is a polymer block comprising a conjugated diene and optionally a monovinylidene aromatic monomer, R is the remnant of a multifunctional coupling agent, n is an integer from 1 to 5, x is a real number from 0 to 4, y is 0 or 1, and z is a real number from 0 to 4; less than 50 wt % of the block copolymer is a B block comprised of isoprene or butadiene, the weight percent of monovinylidene aromatic monomer in the block copolymer is 50 wt % or more, more preferably 65 to 95 wt %; the block copolymer has a MFR of from 0.1 to 50 g/10 min.; and the thermoplastic block copolymer comprises styrene and butadiene; styrene and isoprene; or styrene, isoprene and butadiene; and (C) from 0 to 35 pbw of an extender oil, based on the total weight of A, B and C.

Extrusion blown films may be prepared from the polymer blend compositions of the present invention using standard equipment, standard techniques and typical conditions. A die gap of 5 to 120 mils (127 micrometers (μm) to 3048 μm) is acceptable, a gap of 10 to 80 mils (254 μm to 2032 μm) is preferred, and a gap of 20 to 50 mils (508 μm to 1270 μm) is most preferred. Melt temperatures of 170° C. to 232° C. are acceptable and between 175° C. and 215° C. are preferred. A blow-up ratio of 1:1 to 10:1 is preferred. Rapid cooling of the extruder blown film is preferably performed by a dual lip cooling ring. Due to the low modulus of the film produced from the composition of this invention, a roller-collapsing frame is preferred to avoid bubble chatter.

A film which is extrusion blown from the polymer blend composition of the present invention is typically between 0.5 and 10 mils (12.7 μm to 254 μm) in thickness, and is preferably between 1 and 6 mils (25.4 μm to 152.4 μm) in thickness and is most preferably between 1.5 and 4 mils (25.4 μm to 101.6 μm) in thickness.

Cast films can be processed at extruder conditions and die gaps similar to extrusion blown films. Melt temperatures of 170° C. to 232° C. are acceptable and between 175° C. and 215° C. are preferred. Draw down ratios of 1:1 to 2:1 are preferred for monolayer films. Cast films can be coextruded with the incorporation of one or two skin layers over the elastic core and can be produced at higher draw ratios. As used herein, the term "skin layer" refers to a layer comprising a thermoplastic polymer or polymeric blend. The skin layer can comprise for example polyolefins, such as polyethylene and/or polypropylene, ethylene copolymers such as ethylene vinyl acetate copolymers, polystyrenes, styrene-butadiene copolymers (such as K-RESIN™, styrene-isoprene copolymers, or blends thereof, that are substantially less elastomeric than the elastomeric layer. The skin layer is considered "substantially less elastomeric" if the permanent set of the skin layer is at least 20% greater than that of the elastomeric layer. Permanent set refers to the deformation of a material measured in a sufficient time after the material is released from a specified elongation to allow the material to snap back fully. The skin layer should be a transparent material to allow the combined films structure to maintain its transparency. Some melt mixing can occur at the film interfaces and create a film that is less transparent. Those skilled in the art of coextrusion understand this phenomena. A preferred skin layer is produced from commercially available film grade styrene-butadiene copolymers offered by Chevron Phillips know as K-RESIN™. Block copolymers of monovinylidene aromatic and diene monomers can also be used as skin layers, wherein the block copolymer comprises from 35 to 95 wt % monovinylidene aromatic based on the total weight of the block copolymer. Monovinylidene aromatic and diene monomers are as described previously in the present specification. (Note: the thermoplastic block copolymers described in the present invention can additionally be used as skin layers in multi-layer films).

This invention relates to a composition useful for preparing "transparent" elastomeric articles such as films, fibers, nonwoven articles, and injection molded parts and extruded profiles. The articles of this invention may be used in a wide variety of applications where "transparent" elastomeric materials are useful, as well as in elastomeric applications where transparency is not required. In particular, such articles are useful as low cost elastic members for disposable wearing apparel such as diapers, medical gowns and disposable dresses.

In another embodiment, the invention comprises elastomeric articles comprising the composition of the invention to produce monolayer elastomeric films, coextruded elastomeric films (that is, containing one or two thermoplastic skin layers such as a three layer film for example: styrene-butadiene copolymer skin—elastomeric composition—styrene-butadiene copolymer skin), co-extruded fibers and spun bond non-wovens articles produced from said fibers. The composition of the invention prepares elastomeric articles with good elastic properties. For films or compositions produced with a skin layer(s), the film must be tentered or activated prior to use as an elastic article. The addition of the skin layer makes the elastic article more suitable for conventional film production, in printing operations as well for the production of apertured film.

Test Methods

A. Tensile Strength and Elongation at Failure

Test specimens are obtained from compression molded samples using an ASTM D1822 Type L die with 1.28 centimeter (cm) tabs. Films are cut into 2.54 cm strips in the machine direction (MD) of the film by 15.24 cm long in the transverse direction (TD) (the transverse direction which is at a 90° angle from MD) specimens. The tensile stress-strain properties of the compression molded plaque samples are determined according to ASTM Method D412-87 and ASTM Method D882-91 for the film samples. The average result of three samples is reported.

B. Hardness Test

Shore A durometer hardness is determined according to ASTM D 2240 using a Model 716A Durometer Hardness System available from Shore Instruments. Sample plaques of 3.175 millimeter (mm) thickness were stacked to a thickness of 6.35 mm thickness before testing.

C. Melt Flow Rate

Tested in accordance with ASTM D-1238, at conditions 200 degree centigrade (° C)/5 kg using a standard die with a 2.0955 mm diameter hole (formerly known as Condition D. Two Cycle Hysteresis Test Test specimens are obtained from compression molded samples using an ASTM D1822 Type L die with 1.27 cm or from films. Films are cut into 2.54 cm strips in the machine direction (MD) by 10.16 cm long in the transverse direction (TD). The two-cycle hysteresis is measured at room temperature (about 23° C.) with extension to 200% strain. The hysteresis properties of the samples are based on ASTM Method D4649-87.

E. Optical Properties

Haze and transparency values were determined with a Hunter Lab Tristimulus Colorimeter Model D25P-9 with glass test standard numbered 425 in accordance with ASTM Method D1003-92 on 3.175 mm thick plaques.

F. Molecular Weight of Polymer

When measuring molecular weights, the technique employed is that of gel permeation chromatography employing a polystyrene standard. Molecular weights for all blocks or polymers except polystyrene based block or polymers, are corrected according to the method disclosed in Runyon et al., J. of Applied Polymer Science 13, 2359 (1969) and Tung, J. of Applied Polymer Science 24, 953 (1979).

The following examples are provided to illustrate the present invention. The examples are not intended to limit the scope of the present invention and they should not be so interpreted. Amounts are in weight parts or weight percentages unless otherwise indicated.

Elastomeric Block Copolymer Preparation

BCP-1 (Block Copolymer Preparation-1 is a method for preparing a styrene linear elastomeric styrene-isoprene-styrene (SIS) block copolymer.)

To a 18.5 liter stirred reactor under a nitrogen atmosphere is added 13.68 kilograms (kg) of hydrocarbon solvent which consists of approximately 90% cyclohexane and 10% n-hexane by weight. For solvent purity, the reactor is blanked by adding 11.5 grams (g) of a cyclohexane solution which is 0.1195 molar in low molecular weight polystyryl lithium. At a temperature of 75.6° C., 93.0 g of a 0.220 molar solution of sec-butyllithium in cyclohexane solvent are added followed by 322.9 g of styrene. The polymerization is allowed to continue for 69 minutes, and then 1581 g of isoprene are added at 65° C. which polymerizes and reaches a peak temperature of 94.2° C. At the end of 14 minutes, the temperature is cooled to 76.9° C., and then 322.9 g of styrene monomer is added and allowed to polymerize for 17 minutes. To quench the reaction, 3.5 milliliters (ml) of isopropanol is added. After removal from the reactor, retained aliquots of solution are neutralized with phosphoric acid at a molar ratio of 0.4 mole acid per mole of lithium agent added per unit volume of liquor. Prior to recovery by devolatilization of volatile compounds in a vacuum oven set at 100° C. for a minimum of 3 hours, phenolic antioxidant is added at a level of 1250 parts per million parts (ppm) of base polymer and phosphite antioxidant is added at a level of 3000 ppm of base polymer.

Analysis by size exclusion chromatography shows a single main peak with a number average molecular weight (Mn) of 83,000 on a polystyrene calibration basis and a peak maximum at 108,000 on a polystyrene calibration basis. This polymer is identified as a elastomeric styrene-isoprene-styrene (SIS) block copolymer, containing 29 wt % o styrene.

Thermoplastic Block Copolymer Preparation

BCP-2 (Block Copolymer Preparation-2 is a method of preparing a styrene linear thermoplastic styrene-isoprene-styrene (SIS) block copolymer.)

To a 18.9 liter stirred reactor under a nitrogen atmosphere is added 13.95 kg of hydrocarbon solvent consisting of approximately 90% cyclohexane and 10% n-hexane by weight. For solvent purity, the reactor is blanked by adding 12.9 g of a cyclohexane solution which is 0.1195 molar in low molecular weight polystyryl lithium. At a temperature of 82.1° C., 73.0 g of a 0.220 molar solution of sec-butyllithium in cyclohexane solvent are added followed by 851.6 g of styrene. The polymerization is allowed to continue for 25 minutes, and then 567.7 g of isoprene is added at 72.1° C. which polymerizes and reaches a peak temperature of 78.3° C. At the end of 11 minutes, the temperature is cooled to 71.2° C., and then 851.6 g of styrene monomer is added and allowed to polymerize for 20 minutes. To quench the reaction, 3.5 ml of isopropanol is added. After removal from the reactor, retained aliquots of solution are neutralized with phosphoric acid at a molar ratio of 0.4 mole acid per mole of lithium agent added per unit volume of liquor. Prior to recovery by devolatilization of volatile compounds in a vacuum oven set at 100° C. for a minimum of 3 hours, phenolic antioxidant is added at a level of 1000 ppm of base polymer and phosphite antioxidant is added at a level of 1000 ppm of base polymer.

Analysis by size exclusion chromatography shows a single main peak with a Mn of 111,200 on a polystyrene calibration basis and a peak maximum at 122,200 on a polystyrene calibration basis. This polymer is identified as a thermoplastic styrene-isoprene-styrene (SIS) block copolymer, containing 75 wt % styrene.

Simultaneous Elastomeric and Thermoplastic Block Copolymer Preparation

BCP-3 (Block Copolymer Preparation-3 is a method for preparing a blend of elastomeric and thermoplastic block copolymers simultaneously.)

To a 18.9 liter stirred reactor under a nitrogen atmosphere is added 13.71 kg of hydrocarbon solvent consisting of approximately 90% cyclohexane and 10% n-hexane by weight. For solvent purity, the reactor is blanked by adding 10.5 g of a cyclohexane solution which is 0.117 molar in low molecular weight polystyryl lithium. At a temperature of 76° C., 11.0 g of a 0.220 molar solution of sec-butyl lithium in cyclohexane solvent is added followed by 272.7 g of styrene. The polymerization is allowed to continue for 41 minutes, and then 44.1 g of a 0.220 molar solution of sec-butyl lithium in cyclohexane solvent is added followed by 186.2 g of styrene. The polymerization is allowed to continue for 105 minutes, and then 1551.8 g of isoprene is added at 83.3° C. At the end of 16 minutes, the temperature is cooled to 71.4° C., and then 189.3 g of styrene monomer is added and allowed to polymerize for 77 minutes. To quench the reaction, 3.5 ml of isopropanol is added. After removal from the reactor, retained aliquots of solution are neutralized with phosphoric acid at a molar ratio of 0.4 mole acid per mole of lithium agent added per unit volume of liquor. Prior to recovery by devolatilization of volatile compounds in a vacuum oven set at 100° C. for a minimum of 3 hours, phenolic antioxidant is added at a level of 1000 ppm of base polymer and phosphite antioxidant is added at a level of 1000 ppm of base polymer.

Analysis by size exclusion chromatography shows two peaks, one with a Mn of 135,555 on a polystyrene calibration basis and another peak with a Mn of 189,080 on a polystyrene calibration basis. This polymer is identified as a blend of elastomeric styrene-isoprene-styrene (SIS) and thermoplastic styrene-isoprene-styrene (SIS) block copolymer, containing an average of 31.0 weight percent styrene. The peak with the Mn of 135,555 has a styrene content of 19.4 wt % and the peak with the Mn of 189,080 has a styrene content of 53.1 wt %.

| Polymer | Wt. % Styrene | Type | Mw | Preparation Method | geometry |
|---|---|---|---|---|---|
| PS-1 | 100 | homopolymer | 323,800 | N/A | linear |
| PS-2 | 75 | SBS | 103,000 | BCP-2 | linear |
| PS-3 | 75 | SBSBS | 95,000 | BCP-2 | linear |
| PS-4 | 75 | SB | 140,000-170,000 | NA | radial |
| PS-5 | 75.5 | SIS | 112,000 | BCP-2 | linear |
| PS-6 | 81.4 | SIS | 108,000 | BCP-2 | linear |
| PS-7 | 86.5 | SIS | 109,000 | BCP-2 | linear |
| PS-8 | 75.5 | SIS | 130,000 | BCP-2 | linear |
| PS-9 | 71.5 | SIS | 131,000 | BCP-2 | linear |
| SIS-1 | 29 | SIS | 96,000 | BCP-1 | linear |
| SIS-2 | 30 | SIS | 104,000 | BCP-1 | linear |
| SIS-3 | 30.2 | SIS | 95,000 | BCP-1 | linear |
| SBS-1 | 31 | SBS | 102,000 | BCP-1 | linear |
| SIS-4 | 31 | SIS/SIS | 101,824/158,873 | BCP-3 | Linear/linear |

EXAMPLES

Examples 1-5

Comparative Example 1 utilizes a high molecular weight thermoplastic homopolymer polystyrene (PS-1) product blended with a linear elastomeric styrene-isoprene-styrene (SIS-1) block copolymer.

Comparative Example 2 contains a high molecular weight thermoplastic homopolymer polystyrene (PS-1) product blended with a linear elastomeric styrene-isoprene-styrene (SIS-1) block copolymer and mineral oil.

Comparative Example 3 is a blend of a 29 wt % styrene containing elastomeric styrene-isoprene-styrene (SIS-1) block copolymer and mineral oil.

Example 4 contains a 75 wt% styrene containing linear thermoplastic styrene-butadiene-styrene (PS-2) block copolymer blended with a 29 wt % styrene containing elastomeric styrene-isoprene-styrene (SIS-1) block copolymer and mineral oil.

Example 5 contains a 75 wt % styrene containing linear thermoplastic styrene-butadiene-styrene-butadiene-styrene (SBSBS) pentablock copolymer (PS-3) blended with a 29 wt % styrene containing elastomeric styrene-isoprene-styrene (SIS-1) block copolymer and mineral oil.

Process

Comparative Example 1

20 g of PS-1 and 80 g of SIS-1 are added to a 0.9472 liter jar and filled with 0.5 liter of cyclohexane. The polymer solution is placed on a shaker for 24 hours to allow the polymer to go into solution. The resultant solution is then placed in a devolatilizing oven and the solvent is removed. The resulting polymer blend is then collected and 45 g placed on a pre-heated Farrel 3"×7" (7.6 cm×17.8 cm) roll mill (Model 3FF500) at 155° C. roll temperature for 90 seconds.

The sheet is removed and used for subsequent testing. Sheets' are prepared (approximately 0.94 mm thick) using a pre-heated molding press (PE Model SB234C-X-MS-X24) at 200° C. platen temperature. 7.0 to 7.5 g of the above roll mill specimen is evenly distributed into a 75 mm wide by 115 mm high by 0.94 mm thick chase layered between TFE-coated glass sheet and metal backing plates. The specimen is molded as follows: pre-heat 3.0 minutes at minimal pressure; medium force 0.5 minutes (10,000 kg ram force); material cure 3.0 minutes (20,000 kg ram force); cooling period 4.5 minutes (20,000 kg ram force, ambient temperature water cooling). The specimens are stored at least 24 hours at 23° C. and then die-cut using an ASTM-D 1822 Die L for tensile and hysteresis testing. Initial gauge length is 25.4 mm and 3 specimens per compound are tested. Tensile samples are pulled in the roll mill direction and hysteresis samples are pulled transverse to the roll mill direction. The properties are shown in Table 1.

Comparative Example 2

The process of Comparative Example 1 is repeated using 15 g of PS-1, 80 g of SIS-1 and 5 g of mineral oil.

Comparative Example 3

The process of Comparative Example 1 is repeated using 88.2 g of SIS-1 and 11.8 g of mineral oil.

Example 4

The process of Comparative Example 1 is repeated using 15 g of PS-2, 75 g of SIS-1 and 10 g of mineral oil.

Example 5

The process of Comparative Example 1 is repeated using 15 g of PS-3-, 75 g of SIS-1 and 10 g of mineral oil.

For Comparative Examples 1 and 2, containing polystyrene homopolymers, the compositions show good tensile strength, peak force, stress relaxation and set. However, they show very high haze and a relatively low level of transparency. A virtually opaque elastomeric product is produced.

Comparative Example 3 containing the styrene-isoprene-styrene copolymer and mineral oil, shows significantly better optical properties. A highly transparent elastomeric product with low haze is produced. However, experience tells us that this medium (18 to 33 wt %) styrene elastomeric block copolymer with oil cannot be easily extruded into an elastomeric article. Successful extrusion requires an elastomeric block copolymer containing more than 33 wt % styrene and more preferably 40 wt % styrene or additions of at least 5 wt %, more preferably 10 wt % and most preferably 15 wt % of a thermoplastic polymer or thermoplastic block copolymer. Therefore, although it has good overall properties, and specifically low haze and high transparency, it has little commercial value.

Example 4 contains PS-2, SIS-1 and mineral oil. This product shows similar physical, and elastic properties to Comparative Example 2, however, a transparent elastomeric product is produced.

Example 5 contains PS-3, SIS-1 and mineral oil. This product shows similar physical, elastic and transparency properties to Example 4.

Example 6

A commercially available thermoplastic styrene-butadiene block copolymer (SBS) product (PS-4) is blended with an elastomeric styrene-isoprene-styrene (SIS) block copolymer. The blend contains low levels of slip agent to aid its cast extrusion into a film. It contains no mineral oil. 2830 g of PS-4, 8500 g of SIS-1, and 28.4 g of slip agent (KEMAMIDE™ E Ultra from Crompton Plastics Additives) is

TABLE 1

| | Example | | | | |
|---|---|---|---|---|---|
| Components | 1*<br>PS-1 + SIS-1 | 2*<br>PS-1 + SIS-1 + MO | 3*<br>SIS-1 + MO | 4<br>PS-2 + SIS-1 + MO | 5<br>PS-3 + SIS-1 + MO |
| Ultimate Tensile, MPa | 25.2 | 19.5 | 16.0 | 19.8 | 16.75 |
| Ultimate Elongation, % | 910 | 990 | 1360 | 1170 | 1310 |
| Hardness, Shore A | 62 | 55 | 47 | 59 | 68 |
| Melt Flow Rate, g/10 min. | 13.8 | 24 | 43 | 25 | 35 |
| Peak Force @ 200%, MPa | 2.8 | 2.2 | 1.5 | 1.5 | 2.6 |
| Stress Relaxation, Cycle 1, % | 4.1 | 3.6 | 5.8 | 4.1 | 11.6 |
| Set, Cycle 1, % | 6.6 | 6.4 | 3.4 | 2.7 | 2.3 |
| Haze, % | 84.2 | 88.6 | 43.1 | 37.0 | 40.6 |
| Transparency, % | 51.2 | 52.0 | 91.5 | 89.6 | 78.2 |

*Comparative examples

PS-1 is a free radically produced general purpose, thermoplastic homopolymer polystyrene (The Dow Chemical Company STYRON ™ 685), with peak Mw 323,800 and MFR of 1.7 g/10 minute (200° C.).

PS-2 is a 75 wt % styrene, thermoplastic styrene-butadiene-styrene (SBS) block copolymer, with peak Mw 103,000 and MFR of 8.1 g/10 minute (200° C.).

PS-3 is a 75 wt. % styrene, thermoplastic styrene-butadiene-styrene-butadiene-styrene (SBSBS) block copolymer, with peak Mw 95,000 and MFR of 7.2 g/10 minute (200° C.).

SIS-1 is a 29 wt % styrene containing, elastomeric styrene-isoprene-styrene (SIS) triblock copolymer known as VECTOR ™ 4211, available from Dexco Polymers LP, with peak Mw 96,000 and MFR of 12.0 g/10 minute (200° C.).

The mineral oil (MO) used is a white mineral oil with 200 centipoise (CPS) viscosity known as Witco 200, available from Witco Chemical Co.

blended in a 500-liter ribbon blender for 30 minutes, then compounded and pelletized on a Werner Pfliederer ZSK-70 twin-screw extruder equipped with a Gala pelletizer (1 atmospheric vent, 24 die holes of 6.35 mm diameter). The extruder is operated at 200 to 300 rpm, 145 to 215° C. Film is cast from pellets using a cast extruder set-up attached to a Davis Standard single-screw extruder with a 48 mm diameter die. Temperatures are 160-225° centigrade. The film thickness is 0.013 inch (in) or 0.33 mm and is tested in the transverse or cross direction. The properties are shown in the Table 2.

TABLE 2

| Components | Example 6 PS-4 + SIS-1 |
|---|---|
| Ultimate Tensile, MPa | 31.9 |
| Ultimate Elongation, % | 950 |
| Peak Force @ 200%, MPa | 2.2 |
| Stress Relaxation, Cycle 1, % | 5.9 |
| Set, Cycle 1, % | 6.0 |
| Haze, % | 20.5 |
| Transparency, % | 91.2 |

PS-4 is an anionically produced radial styrene-butadiene copolymer known commercially as K-Resin ™ DK-13. The MFR is 10.0 g/10 minute (200° C.). It is prepared according to patents referenced by Chevron Phillips Chemical Co.
SIS-1 is as stated previously.

Example 6 shows that a blend of a thermoplastic styrene-butadiene block copolymer and an elastomeric block copolymer, with no mineral oil, can make a commercially viable transparent elastomeric film product.

Example 7

The process of Comparative Example 1 is repeated with 20 g of PS-5, 75 g of SIS-2 and 5 g of mineral oil.

Example 8

The process of Comparative Example 1 is repeated with 15 g of PS-6 and 85 g of SIS-2.

Example 9

The process of Comparative Example 1 is repeated with 15 g of PS-7, 70 g of SIS-2 and 15 g of mineral oil.

Example 10

The process of Comparative Example 1 is repeated with 20 g of PS-8, 70 g of SIS-2 and 10 g of mineral oil.

Example 11

The process of Comparative Example 1 is repeated with 15 g of PS-9, 75 g of SIS-3 and 10 g of mineral oil.

TABLE 3

| | Example | | | | |
|---|---|---|---|---|---|
| Components | 7<br>PS-5 + SIS-2 + MO | 8<br>PS-6 + SIS-2 | 9<br>PS-7 + SIS-2 + MO | 10<br>PS-8 + SIS-2 + MO | 11<br>PS-9 + SIS-3 + MO |
| Ultimate Tensile, Mpa | 23.3 | 25.4 | 12.1 | 17.8 | 19.0 |
| Ultimate Elongation, % | 1220 | 1190 | 1275 | 1275 | 1140 |
| Hardness, Shore A | 79 | 83 | 60 | 62 | 55 |
| Melt Flow Rate, g/10 min. | 9.0 | 5.4 | 58 | 11.8 | 37 |
| Peak Force @ 200%, MPa | 3.8 | 4.0 | 2.2 | 1.9 | 3.7 |
| Stress Relaxation, Cycle 1, % | 11.3 | 10.9 | 7.5 | 6.0 | 15.8 |
| Set, Cycle 1, % | 13.2 | 12.6 | 9.2 | 9.3 | 5.6 |
| Haze, % | 24.0 | 21.0 | 18.9 | 18.9 | 17.3 |
| Transparency, % | 90.8 | 90.6 | 86.8 | 90.8 | 89.7 |

PS-5 is a 75.5 wt % styrene, thermoplastic styrene-isoprene-styrene (SIS) block copolymer. The peak Mw is 112,000 and the MFR is 6.5 g/10 minute (200° C.).

PS-6 is a 81.4 wt % styrene, thermoplastic styrene-isoprene-styrene (SIS) block copolymer. The peak Mw is 108,000 and the MFR is 15.7 g/10 minute (200° C.).

PS-7 is a 86.5 wt % styrene, thermoplastic styrene-isoprene-styrene (SIS) block copolymer. The peak Mw is 109,000 and the MFR is 20.0 g/10 minute (200° C.).

PS-8 is a 75.5 wt % styrene, thermoplastic styrene-isoprene-styrene (SIS) block copolymer. The peak Mw is 130,000 and the MFR is 36 g/10 minute (200° C.).

PS-9 is a 71.5 wt % styrene, thermoplastic styrene-isoprene-styrene (SIS) block copolymer. The peak Mw is 131,000 and the MFR is 33 g/10 minute (200° C.).

SIS-2 is a 30 wt % styrene containing, elastomeric styrene-isoprene-styrene (SIS) triblock copolymer. The peak Mw is 104,000 and the MFR is 6.2 g/10 minute (200° C.)

SIS-3 is a 30.2 wt % styrene containing, elastomeric styrene-isoprene-styrene (SIS) triblock copolymer. The peak Mw is 95,000 and the MFR is 14.0 g/10 minute (200° C.).

Example 12

A linear, elastomeric styrene-isoprene-styrene (SIS-3) block is solution blended with a thermoplastic styrene-isoprene-styrene (SIS) block copolymer (PS-9) in a mix tank with mineral oil in a ratio of SIS-3/PS-9/MO of 75:15:10. The solution is fed to a devolatilizing extruder and approximately 275 Kg of pellets are produced. Film is cast from pellets using a cast extruder set-up attached to a Davis Standard single-screw extruder (48 mm diameter die, 160-225° C.). The film thickness is 0.0036 in. (0.091 mm). Properties are shown in Table 4.

TABLE 4

| Components | Example 12<br>PS-9 + SIS-3 + MO |
|---|---|
| Ultimate Tensile, * MPa | 11.30 |
| Ultimate Elongation, % | 990 |
| Peak Force @ 200%, MPa | 0.72 |
| Stress Relaxation, Cycle 1, % | 5.0 |
| Set, Cycle 1, % | 2.9 |
| Haze, % | 14.5 |
| Transparency, % | 91.8 |

Example 12 shows that a blend of a thermoplastic styrene-isoprene block copolymer and an elastomeric block copolymer, with mineral oil, can be produced on the semi-commercial scale to make a commercially viable transparent elastomeric film product.

Surprisingly, the combination of an elastomeric block copolymer with a thermoplastic block copolymer produces a transparent elastomeric article having low-haze and high transparency.

Example 13

The process of Comparative Example 1 is repeated with 20 g of PS-8, 42 g of SIS-2, 28 g of SBS-1 and 10 g of mineral oil. The properties are shown in Table 5.

TABLE 5

| Components | Example 13<br>PS-8 + SIS-2 + SBS-1 + MO |
|---|---|
| Ultimate Tensile, * MPa | 23.2 |
| Ultimate Elongation, % | 1090 |
| Hardness, Shore A | 72 |
| Melt Flow Rate, g/10 min. | 5.0 |
| Peak Force @ 200%, MPa | 2.4 |
| Stress Relaxation, Cycle 1, % | 8.4 |
| Set, Cycle 1, % | 6.6 |
| Haze, % | 29.5 |
| Transparency, % | 91.0 |

SBS-1 is a 31 wt % styrene containing, styrene-butadiene-styrene (SBS) triblock copolymer known as VECTOR ™ 2518, available from Dexco Polymers LP). The peak Mw is 102,000 and the MFR is 6.0 g/10 minute (Modified MFR Conditions 200° C./10 Kg, 0.1564 in. capillary)

Example 13 shows that a blend of a thermoplastic styrene-isoprene-styrene block copolymer and two different elastomeric block copolymers, a styrene-isoprene-styrene block copolymer and a styrene-butadiene-styrene block copolymer, with mineral oil, can produce an elastomeric film product Surprisingly, the combination of two elastomeric block copolymers with a thermoplastic block copolymer produces a transparent elastomeric article having low haze and high transparency.

Process for Preparation of Polymer Example 14

The high styrene content block copolymer component and the low styrene content block copolymer components are produced simultaneously in a single reactor. Thus, 45 g of the polymer is placed on a pre-heated Farrel 3 in.×7 in. (7.6 cm×17.8 cm) roll mill (Model 3FF500) at 155° C. roll temperature for 90 sec. The sheet is removed and used for subsequent testing. Sheets are prepared (approx. 0.94 mm thick) using a pre-heated molding press (PHI Model SB234C-X-MS-X24) at 200° C. platen temperature. 7.0 g to 7.5 g of the roll mill specimen is evenly distributed into a 75 mm wide by 115 mm high by 0.94 mm thick chase layered between tetrafluoroethylene (TFE)-coated glass sheet and metal backing plates. The specimen is molded as follows: pre-heat 3.0 min. at minimal pressure; medium force 0.5 min. (10,000 kg ram force); material cure 3.0 min. (20,000 kg ram force); cooling period 4.5 min. (20,000 kg ram force, ambient temp. water cooling). The specimens are stored at least 24 hours at 23° C. and then die-cut using an ASTM-D 1822 Die L for tensile and hysteresis testing. Initial gauge length is 25.4 mm and 3 specimens per compound are tested. Tensile samples are pulled in the roll mill direction and hysteresis samples are pulled transverse to the roll mill direction.

Example 14

The product produced according to BCP-3 is a bimodal distribution product containing a high molecular weight, high styrene content, SIS block copolymer and a medium molecular weight, low styrene content, SIS block copolymer product (SIS4). The properties are shown in Table 6.

Example 15

The process of Example 1 is repeated with 90 g of SIS4 and 10 g of mineral oil.

The properties are shown in Table 6.

TABLE 6

| Components | Example 14<br>SIS-4 | Example 15<br>SIS-4 + MO |
|---|---|---|
| Ultimate Tensile, * MPa | 29.6 | 13.9 |
| Ultimate Elongation, % | 995 | 1030 |
| Hardness, Shore A | 46.1 | 38.5 |
| Melt Flow Rate, g/10 min. | 13.2 | 38 |
| Peak Force @ 200%, MPa | 1.31 | 0.98 |
| Stress Relaxation, Cycle 1, % | 1.5 | 2.1 |
| Set, Cycle 1, % | 5.4 | 6.7 |
| Haze, % | 15.8 | 11.7 |
| Transparency, % | 89.2 | 88.9 |

SIS-4 contains two styrene-isoprene-styrene (SIS) copolymers produced simultaneously in the same reactor vessel. The peak Mw for one of the polymers is 101,824 and the other is 158,873. The styrene content is 31.0 wt. % and MFR is 13.2 g/10 min.

Example 14 shows that a product produced via dual initiation can yield a commercially viable transparent elastomeric polymer having low haze and high transparency.

Example 15 shows that the addition of mineral oil produces a softer, more processable, transparent elastomeric polymer versus Example 14.

The invention claimed is:

1. An elastomeric polymer blend composition comprising:

A) from 65 to 92 parts by weight of at least one elastomeric monovinylidene aromatic-conjugated diene block copolymer, having a monovinylidene aromatic content of less than 50 weight percent based on the total weight of the elastomeric copolymer, and a weight average molecular weight of from 50,000 to 400,000;

B) from 8 to 35 parts by weight of at least one thermoplastic monovinylidene aromatic-conjugated diene block copolymer, having a monovinylidene aromatic content of 60 weight percent or more based on the total weight of the thermoplastic copolymer, and a weight average molecular weight from 50,000 to 300,000; and C) from 0 to 30 parts by weight of an extender oil, based on the total weight of A, B and C, wherein the elastomeric polymer blend composition does not contain an amount of any polymer other than A and B greater than 5 weight percent of the blend, and wherein a plaque comprised of the elastomeric polymer blend composition has a percent haze of less than 50 percent and a percent transparency of greater than 75 percent in accordance with ASTM Method D 1003-92.

2. The polymer blend composition of claim 1 wherein the elastomeric block copolymer (A) is selected from A-B-A triblock copolymers, A-B-A-B tetrablock copolymers, A-B-A-B-A pentablock copolymers, and mixtures thereof, wherein each A is independently a polymer block produced from a monovinylidene aromatic monomer and each B is independently, a polymer block produced from a conjugated diene and optionally a monovinylidene aromatic monomer.

3. The polymer blend composition of claim 1 wherein the thermoplastic block copolymer (B) is selected from A-B block copolymers, A-B-A triblock copolymers, A-B-A-B tetrablock copolymers, A-B-A-B-A pentablock copolymers, and mixtures thereof, wherein each A is independently a polymer block produced from a monovinylidene aromatic monomer and each B is independently, a polymer block produced from a conjugated diene and optionally a monovinylidene aromatic monomer.

4. The polymer blend composition of claim 1 wherein each monovinylidene aromatic monomer is selected from styrene, alpha-methylstyrene, vinyltoluene, vinylpyridine or mixtures thereof; and each conjugated diene is selected from 1,3-butadiene, isoprene, 1,3-pentadiene or mixtures thereof.

5. The polymer blend composition of claim 1 wherein each monovinylidene aromatic monomer block of the elastomeric block copolymer has a peak weight average molecular weight of 9,000 or more and each conjugated diene block of the elastomeric block copolymer has a peak weight average molecular weight of 50,000 or more.

6. The polymer blend composition of claim 1 wherein the block copolymer of (A) and/or the block copolymer of (B) is a radial block copolymer.

7. The polymer blend composition of claim 1 wherein the elastomeric block copolymer has a refractive index of from 1.5240 to 1.5526 and/or the thermoplastic block copolymer has a refractive index of 1.5526 to 1.5925 as measured using a pressed film of the polymer blend composition less than 0.020 inches (0.05 cm) thick using an Abbe-type refractometer at 25° C. according to ASTM Standard D-542.

8. The polymer blend composition of claim 1 wherein each monovinylidene aromatic monomer block of the thermoplastic block copolymer has a peak weight average molecular weight of 12,500 or more and each conjugated diene block of the thermoplastic block copolymer has a peak weight average molecular weight of 2,500 or more.

9. The polymer blend composition of claim 1, having the following properties:

a tensile strength greater than 10.0 MPa;

a peak force at 200 percent elongation of greater than 0.7 MPa a set of 15 percent or less;

a stress relaxation of 20 percent or less;

a percent haze of less than 50 percent; and a percent transparency of greater than 75 percent.

10. A process for producing the composition of claim 1 comprising:

polymerizing a monovinylidene aromatic monomer and a diene monomer to produce an elastomeric block copolymer polymerization mixture comprising a block copolymer of less than 50 weight percent monovinylidene aromatic monomer, based on the total weight of the block copolymer;

polymerizing a monovinylidene aromatic monomer and a diene monomer to produce a thermoplastic block copolymer polymerization mixture comprising a block copolymer of at least 60 weight percent monovinylidene aromatic monomer, based on the total weight of the block copolymer;

contacting the elastomeric copolymer polymerization mixture with the thermoplastic copolymer polymerization mixture to form a blended polymerization mixture;

devolatilizing the blended polymerization mixture to form a blended polymer product, and pelletizing the blended polymer product.

11. The composition of claim 1 formed into an article.

12. A composition, comprising:

A) from 65 to 92 parts by weight one or more elastomeric block copolymer(s) corresponding to the formulas A-B-R(-B-A)$_n$ and A-(BA-)$_x$-BA, wherein each A is independently a polymer block produced from a monovinylidene aromatic monomer;

each B is independently a polymer block produced from a conjugated diene and, optionally, a monovinylidene aromatic monomer;

R is the remnant of a multifunctional coupling agent;

n is an integer from 1 to 5; and x is a real number from 0 to 4, and wherein at least 50 weight percent of the one or more elastomeric block copolymer(s) is comprised of a B block further comprised of isoprene, butadiene, or combinations thereof, and the monovinylidene aromatic content of one or more elastomeric block copolymer(s) is less than 50 weight percent based on the total weight of the one or more elastomeric block copolymer(s);

B) from 8 to 35 parts by weight of one or more thermoplastic block copolymer(s) corresponding to the formulas A-B-R(-B-A)$_n$, A-(BA-)$_x$-BA, and B$_y$-(AB-)$_z$-AB, wherein, each A is independently a polymer block produced from a monovinylidene aromatic monomer;

each B is independently a polymer block produced from a conjugated diene and, optionally, a monovinylidene aromatic monomer;

R is the remnant of a multifunctional coupling agent;

n is an integer from 1 to 5;

x is a real number from 0 to 4;

y is 0 or 1; and z is a real number from 0 to 4, and wherein less than 50 weight percent of the one or more thermoplastic block copolymer(s) is comprised of a B block further comprised of isoprene, butadiene, or combinations thereof, and the monovinylidene aromatic content of the one or more thermoplastic block copolymer(s) is at least 60 weight percent based on the total weight of the one or more thermoplastic block copolymer(s); and C) from 0 to 35 parts by weight of an extender oil, based on the total weight of A, B and C, wherein the composition does not contain an amount of any polymer other than A and B greater than 5 weight percent of the blend, and wherein a plaque comprised of the composition has a percent haze of less than 50 percent and a percent transparency of greater than 75 percent in accordance with ASTM Method D 1003-92.

13. The composition of claim 12, wherein the monovinylidene aromatic monomer is styrene.

14. The composition of claim 12, wherein the one or more elastomeric block copolymer(s) and the one or more thermoplastic block copolymer(s) have a MFR of from about 0.1 to about 50 g/10 minutes.

15. The composition of claim 12, wherein the one or more elastomeric block copolymer(s) is comprised of no more than 5 weight percent of a diblock of the formula B-A.

16. The composition of claim 12, wherein the one or more elastomeric block copolymer(s) have a refractive index of from 1.5240 to 1.5526 as measured using a pressed film of the polymer blend composition less than 0.020 inches (0.05 cm) thick using an Abbe-type refractometer at 25° C. according to ASTM Standard D-542.

17. The composition of claim 12, wherein the one or more thermoplastic block copolymer(s) have a refractive index of 1.5526 to 1.5925 as measured using a pressed film of the polymer blend composition less than 0.020 inches (0.05 cm) thick using an Abbe-type refractometer at 25° C. according to ASTM Standard D-542.

18. The composition of claim 12 formed into an article with the following properties:

a tensile strength greater than 10.0 MPa;

a peak force at 200 percent elongation of greater than 0.7 MPa;

a set of 15 percent or less;

a stress relaxation of 20 percent or less;

a percent haze of less than 50 percent; and a percent transparency of greater than 75 percent.

* * * * *